Aug. 19, 1952     F. A. RYDER ET AL     2,607,816
ELECTRIC MOTOR
Filed Jan. 29, 1947     2 SHEETS—SHEET 1
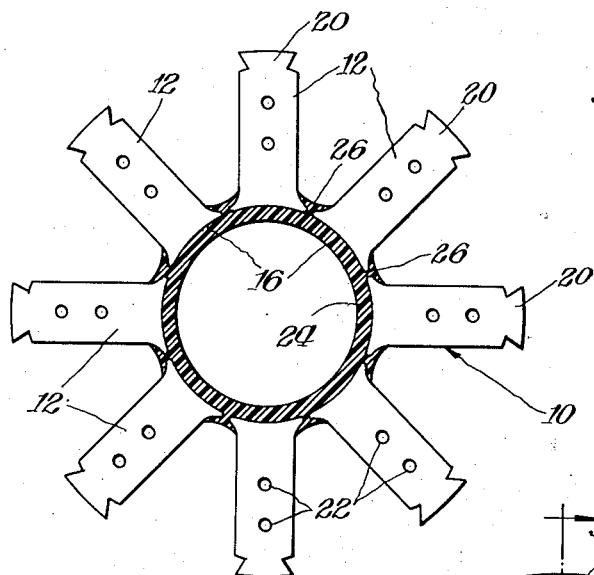
Fig. 1
Fig. 2
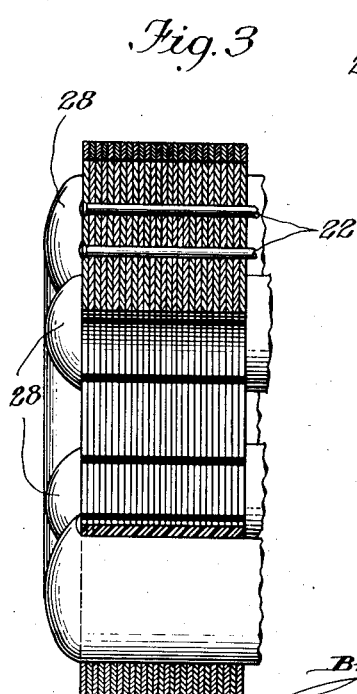
Fig. 3
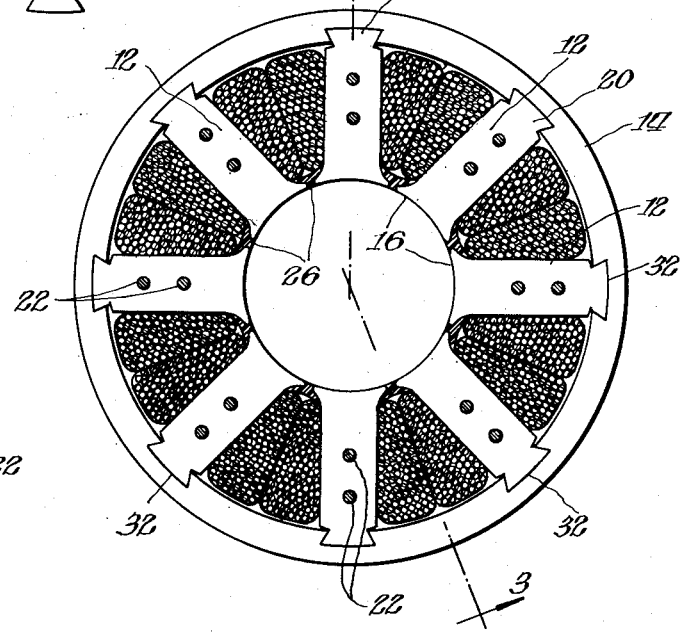
Inventors:
Frank A. Ryder,
Ross D. Randall
By Hinkle, Horton, Ahlberg, Hansmann & Wupper
Attorneys

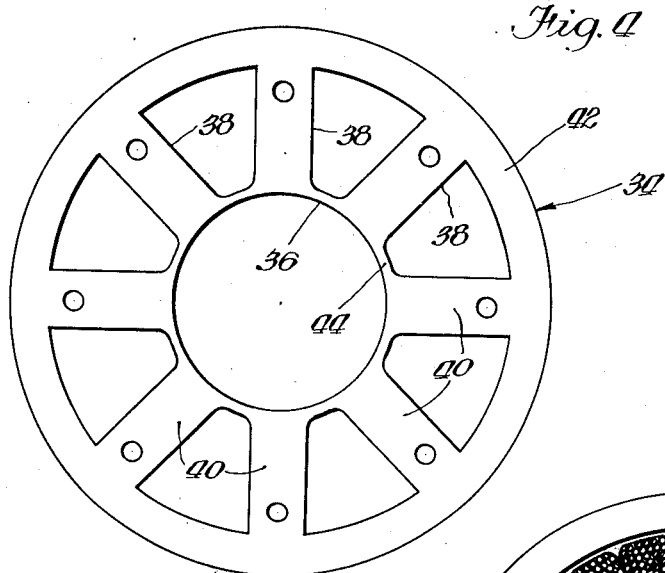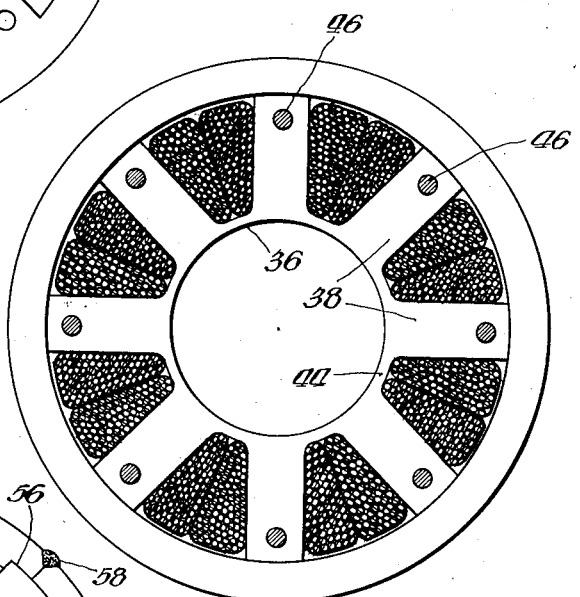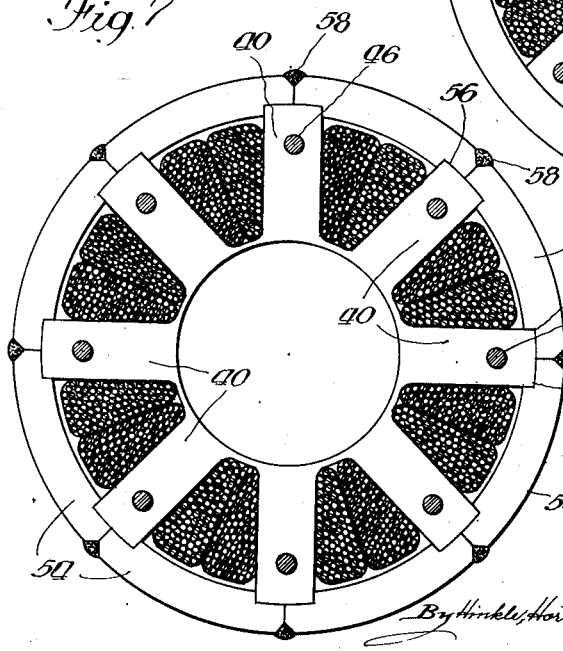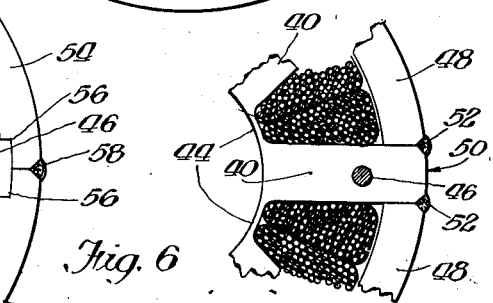

Patented Aug. 19, 1952

2,607,816

UNITED STATES PATENT OFFICE 2,607,816

ELECTRIC MOTOR

Frank A. Ryder and Ross D. Randall, Indianapolis, Ind., assignors to Stewart-Warner Corporation, Chicago, Ill., a corporation of Virginia Application January 29, 1947, Serial No. 725,054

1 Claim. (Cl. 171—252)

The present invention relates to electric motors and more particularly to a new and improved stator construction for an induction type motor which facilitates the winding of the stator coils thereon so that the cost of manufacture and the time required to construct a motor of this type are reduced.

The stator of the conventional induction motor consists of an annular core of laminated construction in which a series of cells is formed for receiving the windings forming the stator coils. These cells are defined by the inner pole pieces and outer rims of the stator core laminations and a series of equally spaced cross bars or cell dividers integral with and connecting the pole pieces and outer rims of the laminations. Stators of this type are conventionally wound from the inside. That is, the windings are laid in the cell by pushing the wire through slots between the pole pieces. These slots are relatively narrow and often not readily accessible, particularly in small stators so that the winding of a stator as now practiced is a tedious and time consuming task and appreciably contributes to the high cost of motors of this type. This is particularly true of motors having numerous poles and what are known as distributed windings.

The present invention is concerned primarily with a new form of stator core construction in which the cells in the core are made accessible from the outside so that the stator may be wound from the outside instead of the inside, thereby eliminating the difficulty heretofore encountered in winding conventionally constructed stator cores.

Several different constructions are disclosed herein for accomplishing this, the essential feature of each being a laminated core of fabricated construction rather than unitary construction, the cell dividers and the portion forming the inner rim or pole pieces constituting one element which may be called a cell divider assembly and the portion constituting the outer rim forming another element which may be called the peripheral rim assembly. These two elements are permanently secured together in the completed core. Before this is done, however, the windings forming the stator coils are laid in the series of annularly disposed open ended slots or cells formed between the pole pieces and between adjacent cell dividers and since the peripheral rim asembly is not secured to the cell divider assembly until after winding is completed, the winding may be done from the outside at a great saving in time. In other words, the cell divider assembly can be wound in the same manner and on the same machinery as a direct current armature.

Accordingly, a primary object of the invention is the provision of a new and improved core for the stator of an electric motor so constructed that it may be wound from the outside, thereby greatly simplifying the winding of a stator and reducing the cost of manufacture thereof.

A further object of the invention is the provision for an electric motor of a new and improved stator having a core of generally conventional configuration fabricated from elements which are adapted to be separately stacked from blanks of the desired configuration which separate stacks may be assembled in a manner to facilitate winding of the core.

Another object of the invention is the provision of a new and improved fabricated stator for induction type electric motors consisting of a plurality of identical pole piece elements of laminated construction adapted to be bonded together by temporary means to form an annularly disposed series of externally opening cells for receiving the stator coils by external winding and a separate peripheral rim assembly adapted to encompass the cell forming elements and to be permanently secured to the cell assembly for permanently binding the assembled structure together to form a completed stator.

A still further object of the invention is the provision of a new and improved stator for induction type electric motors which has a fabricated core of laminated construction formed by stacking laminations made from unitary blanks having the configuration of the assembled core by subdividing the blanks in such manner that the subdivided elements may be stacked in separate operations to form a cell divider assembly which is adapted to be wound by laying in the windings from the exterior, and an outer peripheral rim assembly adapted to be stacked in interfitting relation with the wound cell divider assembly to form the complete stator.

Another object of the invention is the provision of a new and improved method for constructing and assembling stator cores which permits winding of the stator coils from the outside instead of the inside, thereby greatly reducing the time and labor required to construct a stator.

Other objects and advantages of the invention will become apparent from the following description and accompanying drawings, in which:

Fig. 1 is a plan view of a series of cell dividers and pole pieces secured together by temporary means to form a cell divider assembly for receiving the stator coil windings;

Fig. 2 is a transverse sectional view of one form of stator core construction taken between two adjoining core laminations;

Fig. 3 is a fragmentary cross sectional view of an assembled stator core taken on the line 3—3 of Fig. 2;

Fig. 4 is a plan view of a unitary blank of the type used in constructing modified forms of stator cores before the blank has been subdivided;

Fig. 5 is a transverse sectional view of one modified form of assembled stator core taken between two adjoining core laminations;

Fig. 6 is a fragmentary transverse cross sectional view of another modified form of stator core assembly; and Fig. 7 is a transverse cross sectional view of still another modification of the invention.

Referring to Figs. 1 to 3 of the drawings it will be noted that in the embodiment of the invention therein shown the assembled stator core is fabricated from two different elements, namely, the cell divider assembly 10 comprising a plurality of annularly arranged cell dividers 12 having pole pieces at their inner ends of which eight are shown in the drawing each of laminated construction, and a peripheral rim assembly 14 also of laminated construction to which the cell dividers in the cell divider assembly are joined after the stator coils have been wound for permanently securing the assembled elements together to form the completed stator.

In constructing a stator of this type a multiplicity of blanks from which the cell dividers 12 are stacked is punched from sheet metal of the proper thickness, and since all of the cell dividers for a particular stator are of identical construction the same blanks may be used for stacking each of the dividers. The inner ends of these blanks are concave in contour as indicated at 16 so as to form the individual pole pieces on a radius such that when the number of cell dividers to be used in a core have been arranged in assembled relation the inner edges of the cell dividers define a cylindrical transversely extending opening within which the rotor is located in an assembled motor. At their outer ends, each of the cell divider blanks is provided with a dovetail lug 20, the purpose of which will be described hereinafter.

Each cell divider used in a particular stator is stacked from the same number of laminations and each stack is secured in assembled relation by means of rivets 22 or the like. The number of stacked divider assemblies required for a particular stator core are then arranged in annularly disposed relation in a suitable form for securely holding them in position and are molded into a ring 24 of bonding material in any well known manner. Any suitable plastic material, such as "Bakelite" for instance, may be used for this purpose provided it is of sufficient strength to hold the dividers in assembled relation while the divider assembly is being wound and preferably this material should extend into the spaces between adjacent pole pieces as shown at 26 to bind the entire assembly together into a solid unit. The structure thus formed is shown in plan in Fig. 1 from which it will be noted that it comprises a hub and spoke-like structure having a series of open ended cells between the dividers 12. The windings forming the stator coils shown at 28 in Fig. 3 are laid in these cells by winding the same from the outside. It is to be understood that the number and arrangement of coils can be as desired for a particular motor. In general, ordinary armature winding equipment can be used for this purpose.

Referring to Fig. 2 it will be seen that the second element of the stator core is the peripheral rim assembly 14 and this, like the dividers 12, is of laminated construction, the separate rim laminations being punched from sheet core iron stock of the requisite thickness. Along their inner periphery these rims are provided with equally spaced dovetailed cut-out portions or slots 32 complementary in configuration and spacing to the lugs 20 on the outer tips of the cell dividers 12.

The rim assembly 14 is pressed upon the previously wound cell divider assembly either as one piece or the separate laminations may be pressed thereon one at a time with the lugs 20 engaging in the slots 32 in the inner periphery of the rings so as to comprise a rigid core structure forming a good magnetic circuit. If desired, half of the group of rings may be pressed upon the cell divider assembly from one end while the other half is pressed thereon from the other end.

After the laminated ring is in place upon the cell divider the temporary binding ring 24 attached to the pole pieces is removed, but that portion of the bonding material which extends between the pole pieces may be allowed to remain as indicated at 26 in Fig. 2 to aid in binding the inner ends together.

The temporary plastic binding agent which secures the cell dividers together in assembled relation while the stator coils are being wound is omitted in the modifications shown in Figs. 4 to 7. In these modifications the cell divider assembly is made up of unitary laminated hub and spoke-like blanks instead of the separate divider blanks used in the modification shown in Figs. 1 to 3, the pole pieces being connected at their adjacent ends by enough of the metal so that a stack of these unitary divider blanks secured together forms a sufficiently rigid core to permit winding of the stator coils thereon.

In constructing stators according to the modifications shown in Figs. 4 to 7, a multiplicity of blanks 34 of the form as shown in Fig. 4 are first stamped from sheet core iron of the proper thickness. These blanks are circular with a concentric cut-out portion 36 which in the assembled stator defines a transversely extending cylindrical opening for housing the rotor of the motor. A plurality of annularly arranged equally spaced generally sector shaped openings 38 are also punched in the body of the blank so as to form spaces for the coil cells in the assembled stator. These cell openings are defined between a plurality of radially extending cell dividers 40, the outer rim or ring 42 being integral therewith and the integral inner ring or connection 44 acting to form the pole pieces and the connectors therebetween.

To construct the form of the invention shown in Fig. 5 these blanks are sheared along the inner edge of the outer rim 42 and the unitary cell dividers thus formed are stacked and secured together in stacked relation by suitable means, such as rivets 46. The open cell divider assembly thus formed is sufficiently sturdy so that the stator coils may be wound thereon as previously described in connection with the first embodiment of the invention.

After completion of the winding, the wound cell divider assembly is placed in a jig or form and the peripheral rim is pressed thereover either as a single element or each of the laminations may be pressed into position over the wound cell dividers 40 one at a time until the rim has been built up to the thickness of the cell divider assembly, thus completing the assembly of the stator core.

In constructing the stator shown in Fig. 6 a series of blanks 34 generally similar to that shown in Fig. 4 may be used, although for this form of stator the connections 44 between the pole pieces at the inner ends of the dividers 40 need not be as heavy as that in the divider blanks used when constructing the stator shown in Fig. 5. Instead of shearing off the outer rim from the dividers the rim is transversely sheared in line with the edges of the dividers 40 so that the rim is cut into separate segments 48. The cell divider blanks 50 thus formed are then stacked and wound in a manner similar to that followed in assembling the stator shown in Fig. 5. After the winding has been completed the wound divider assembly is placed in a form and the ring segments 48 are pressed into position and secured in any suitable manner so as to obtain adequate strength and magnetic conductivity, such as by welding the segments to the tips of the dividers along the lines formed at their juncture at the outer surface of the core as indicated at 52 in Fig. 6.

A further modification of the invention is shown in Fig. 7 in which the outer rim is formed by segments 54, but these segments are cut upon the center line of the dividers 40 instead of along a line coinciding with the edges of the dividers so that they completely encompass the core when the core elements are assembled instead of extending only between the dividers. In addition to this, it will be noted that the inner edges of the ends of the segments are notched, as at 56, so that slots are formed at the adjacent ends of adjoining segments to embrace the outer ends of the cell dividers 40.

The stator shown in Fig. 7 is assembled in much the same manner as that shown in Fig. 6 and the segments 54 are permanently secured together by welding the same along the lines where the ends of adjacent segments abut, as indicated at 58 in Fig. 7.

As will be apparent to those familiar with motor characteristics, a stator constructed as shown in Figs. 1, 2 and 3 will have the highest efficiency because there will be the least leakage in flux between the pole pieces. A stator of the type shown in Figs. 4 and 5 will involve somewhat greater loss from this standpoint because of the bridges 44 which connect adjacent ends of the pole pieces. On the other hand, a motor manufactured according to the last embodiment should be lower in cost and for some types of duty considerable leakage is necessary in order to obtain high starting torque. It is apparent, therefore, that whether the arrangement shown in Figs. 1, 2 and 3 or that of Figs. 4 and 5 is to be preferred depends upon the type of duty and upon whether or not the extra efficiency is worth the extra cost.

A stator constructed as shown in Figs. 6 or 7 will have characteristics between the two above-mentioned types since although the latter type construction has iron bridges 44 between the pole pieces, these bridges are somewhat smaller than those shown in Figs. 4 and 5 and therefore the leakage will be less. It will be appreciated that the bridges 44 of the modifications shown in Figs. 6 and 7 may be smaller than those shown in Figs. 4 and 5 because the final assembly does not place the spider-like structure under the compressive force which is encountered when the rings are pressed over the core. In the modifications of Figs. 6 and 7 the bridges 44 need to have only sufficient strength to give the core enough rigidity to withstand the stresses encountered during the winding operation. This is particularly true in the modification of Fig. 6 wherein the segments 48 are welded directly to the ends of the dividers 40 so that these segments help to support the dividers and pole pieces in the final assembly.

When properly welded this assembly will be sufficiently rigid so that the connecting bridges 44 may be machined to further reduce their cross sectional area and thereby further reduce the flux leakage across these connecting bridges. This can also be done with the modification shown in Fig. 7 and as a result these two modifications will quite closely approximate in efficiency the modification shown in Figs. 1 to 3.

While we have shown and described preferred embodiments of our invention, it will be apparent that numerous variations and modifications thereof may be made without departing from the underlying principles of the invention. We therefore desire, by the following claim, to include within the scope of the invention all such variations and modifications by which substantially the results of our invention may be obtained through the use of substantially the same or equivalent means.

We claim:

In the fabrication of a stator for an electric motor having a core of laminated construction, the method which comprises punching the blanks for the pole pieces and stator rim of said core, forming a plurality of separate pole pieces by stacking the pole piece blanks as a separate operation, molding the inner ends of said separate pole pieces into a temporary bonding material for fixedly securing said separate pole pieces in radially disposed relation with sufficient rigidity to form a plurality of outwardly opening slot cells adapted to be wound externally, winding the coils in said cells in a manner corresponding to armature winding, applying the rim to said wound pole pieces and then removing the impermanent bonding material adhering to the inner faces of said pole pieces.

FRANK A. RYDER.
ROSS D. RANDALL.

REFERENCES CITED

The following references are of record in the file of this patent:

UNITED STATES PATENTS

| Number | Name | Date |
| --- | --- | --- |
| 996,571 | Edwards | June 27, 1911 |
| 1,794,618 | Howe | Mar. 3, 1931 |
| 1,957,380 | Barlow | May 1, 1934 |
| 1,978,100 | Buerke | Oct. 23, 1934 |
| 2,153,563 | Hubacker | Apr. 11, 1939 |
| 2,172,191 | Denman | Sept. 5, 1939 |